L. R. SMITH.
REGULATOR.
APPLICATION FILED APR. 6, 1909.
967,847.
Patented Aug. 16, 1910.
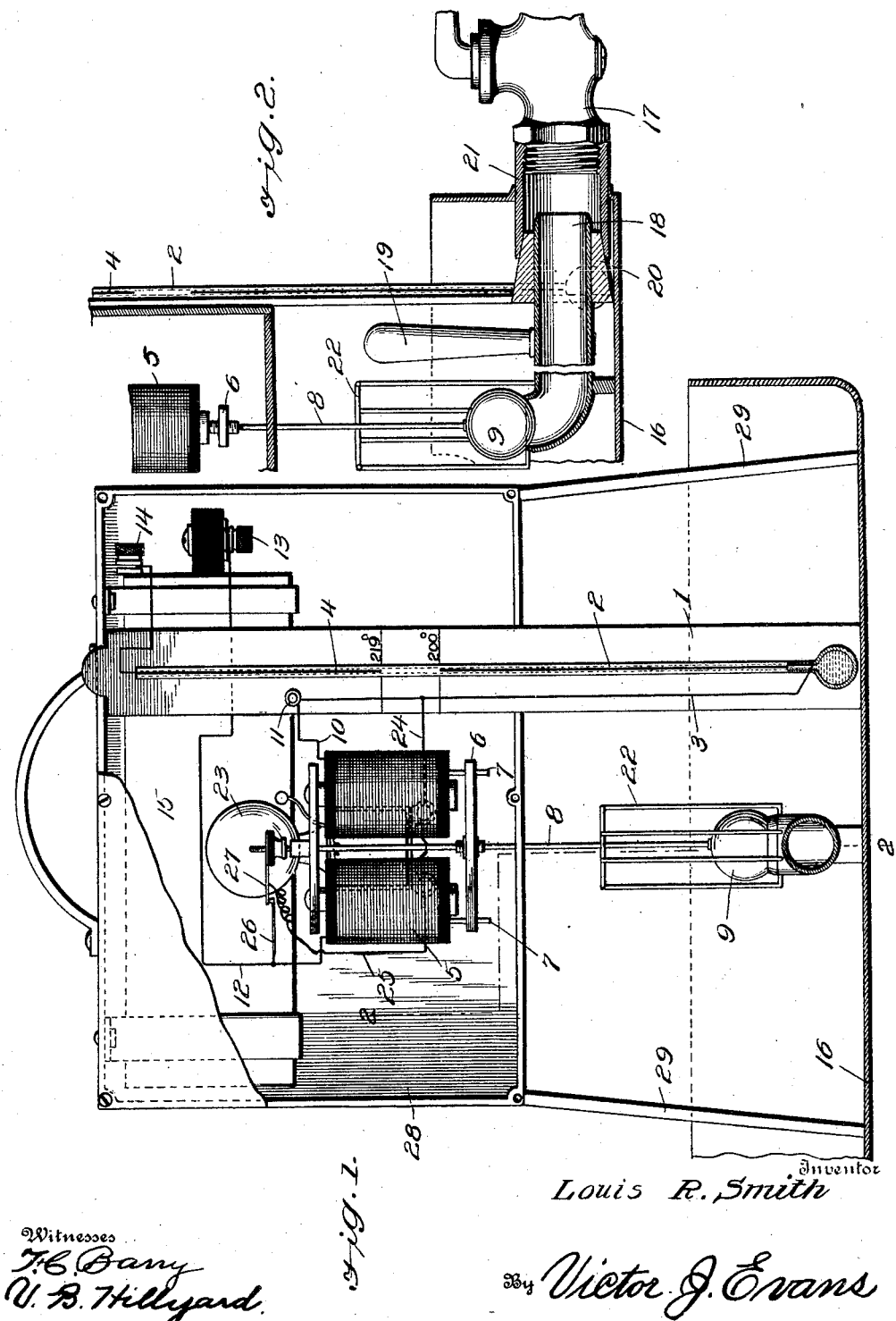
Inventor
Louis R. Smith
By Victor J. Evans
Attorney
Witnesses
F. G. Barry
V. B. Hillyard

UNITED STATES PATENT OFFICE.

LOUIS R. SMITH, OF CHARDON, OHIO.

REGULATOR.

967,847.  Specification of Letters Patent.  Patented Aug. 16, 1910.

Application filed April 6, 1909. Serial No. 488,258.

*To all whom it may concern:*

Be it known that I, LOUIS R. SMITH, a citizen of the United States, residing at Chardon, in the county of Geauga and State of Ohio, have invented new and useful Improvements in Regulators, of which the following is a specification.

The purpose of the present invention is to devise novel means for automatically regulating the flow of liquid from any vessel in which the liquid is boiled after the same has reached a given temperature, the same being based upon the principle of the specific gravity of the liquid and likewise the weight for a given quantity is constant at a predetermined temperature.

The invention provides a regulator device primarily for use in the manufacture of maple syrup or it may be adapted for any other liquid.

In the manufacture of maple syrup it has been ascertained both scientifically and experimentally that the syrup is at its best when it weighs approximately eleven pounds to the gallon and it has also been determined that the syrup when boiled to a temperature of 219° F. weighs about eleven pounds to the gallon. In its application, the invention is designed to regulate the flow of maple syrup from the boiling receptacle at the said temperature of 219° F. and for a full understanding of the invention reference is to be had to the following description and the drawing hereto attached, corresponding and like parts being referred to in the description and indicated in both views of the drawings by the same reference characters.

The invention consists of the novel features, details of construction and combinations of parts which hereinafter will be more particularly set forth and claimed.

In the drawings: Figure 1 is a view in elevation of a regulator embodying the invention, parts being broken away. Fig. 2 is a detail section on the line 2—2 of Fig. 1.

The invention embodies a thermal circuit closer, a valve for closing the outlet from the receptacle containing the liquid to be boiled and an electric controller for operating the valve and included in a circuit which is adapted to be closed by the aforesaid thermal circuit closer when the predetermined temperature has been reached.

The thermal circuit closer may be of any design and as illustrated appears as a thermometer comprising a support 1, and a tube 2 provided at its lower end with a bulb to receive an agent such as mercury sensitive to thermal changes and expansible. The base 1 is adapted to receive suitable graduations or marks determining given temperatures. The thermal device is included in an electric circuit which also includes the electric controller for the valve governing the outflow from the receptacle. The mercury within the tube 2 constitutes one terminal of the circuit, a wire 3 being in electrical connection therewith and entering the tube at or near the bulb. A wire 4 extends into the upper portion of the tube and constitutes the other terminal of the electric circuit. The wire 4 terminates at the predetermined point corresponding to the required temperature which in the present instance is 219° F. It is to be understood that the extremity of the wire 4 may be relatively positioned at any point corresponding to the temperature to which the liquid is to be boiled. The parts are so constructed and proportioned that when the liquid reaches the prescribed temperature the mercury in the tube 2 expands so as to touch the wire 4 and close the circuit whereby the electric valve controller is automatically brought into play to uncover the outlet and permit the liquid to pass off from the receptacle into any container.

The electric controller comprises an electro-magnet 5 and an armature 6, said electro-magnet being included in the electric circuit containing the thermal circuit closing device. The armature 6 is directed in its movements by guides 7 and is adjustable upon a rod 8 which latter is provided with the valve 9 or has connection therewith. One terminal of the helix of the electro-magnet 5 is indicated at 10 and is connected with a binding post 11. The other terminal of the helix is indicated at 12 and is connected with a binding post 13 of a battery or other electro-motive force. The wire 3 is electrically connected with the binding post 11. The wire 4 is connected with a binding post 14 representing the other pole of the battery or like electro-motive force. The battery device is indicated at 15 and may be of any make or type. When the mercury in the tube 2 expands so as to make contact with the wire 4, the circuit is completed and the electro-magnet 5 is energized and the armature 6 attracted thereby unseating the valve 9 and permitting the outflow of the liquid from the pan or other receptacle. When the temperature lowers, the mercury contact and the circuit is broken and the electro-magnet 5 becoming demagnetized, the armature 6 no longer being attracted moves downward or in such a manner as to admit of the seating or closing of the valve 9 thereby shutting off further discharge of the liquid.

The pan or receptacle is indicated by the reference numeral 16 and the outlet therefrom is controlled by means of a cock 17 which is adapted to be manually operated. A nozzle 18 extends into the outlet and is normally closed by the valve 9. The nozzle 18 is provided with a handle 19 which is grasped when manipulating the nozzle as when placing the same in position or removing it from the pan or receptacle 16. A tapered bushing 20 is fitted upon the discharge end of the nozzle 18 and may be formed of cork or other material, the purpose being to insure a tight fit between the nozzle 18 and the outlet opening or tubular coupling 21 to which the nozzle and cock 17 are fitted. A cage 22 fitted to the inner end of the nozzle 18 constitutes a guide for the valve 9 to insure a square and proper seating and working of said valve.

It is proposed to combine with the regulator signaling means to apprise the operator of the non-working of the automatic controlling means. The signaling means may be of any type and as illustrated is preferably of audible variety adapted to be electrically actuated and included in a shunt of the main circuit. The audible signal consists of an electric bell 23 which may be of any construction adapted to be operated the instant the circuit is closed. A wire 24 connects one terminal of the bell with the wire 3. A wire 25 connects the other terminal of the bell with a contact 27 adjustably mounted upon the rod 8. A contact 26 connected with the wire 12 coöperates with the contact 27 to close the circuit through the bell. Under normal conditions, that is, when the valve 9 is closed, the contacts 26 and 27 are in communication so as to complete the circuit when the mercury in the tube 2 expands and touches the extremity of the wire 4. When the mechanism is in perfect working condition and the valve free to operate, the circuit when closed will result in the electro-magnet 5 attracting the armature 6 and unseating the valve 9 and at the same time moving the contact 27 away from the contact 26 thereby breaking the signaling circuit. Should the valve 9 stick or remain seated after the circuit has become closed, the operator will be apprised of this feature by the signaling means, which in the present instance consists of a sounding of the electric bell 23. When the valve 9 is closed and the electric circuit is broken, the signaling means are inactive.

While the invention is shown in its adaptation for use in connection with the boiling of maple syrup it is to be understood that it is not restricted to such use but may be employed generally for oil or other liquids requiring to be boiled to a given temperature and then drawn off from the receptacle in which boiled.

It will be understood that the mechanism is entirely automatic in action and should the valve fail to open from any cause after the predetermined temperature has been reached, the operator will be advised from the signaling means which will continue to give a signal until the apparatus has been restored to working condition or the temperature falls below that essential to effect automatic closing of the circuit.

The valve and regulating means may be disposed in any convenient manner. As indicated a case 28 is provided to receive the battery 15, the electric controller and the signal. This case is provided with supports 29, the latter entering the liquid in the receptacle or pan and resting upon the bottom thereof so as to support the operating means at a proper elevation. The valve 9 for controlling the outlet and the bulb of the tube 2 are located below the case 28 in position to be immersed in the boiling liquid contained in the pan 16 so as to be acted upon directly by said liquid. By having the bulb of the tube 2 located directly in the boiling liquid the mercury contained therein is more susceptible to changes in the temperature of the liquid and is thereby made more responsive.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention, what is claimed is—

1. In combination a receptacle for liquid to be heated to a given temperature provided with an outlet, a valve closing said outlet, an electric controller for moving the valve to uncover the outlet included in an electric circuit, a thermal circuit closer operated by the temperature of the liquid contained in said receptacle to effect automatic discharge of the liquid from the said receptacle, an electric signal, a circuit including the said signal, and a circuit closer for the signal circuit normally closed and adapted to be opened by said electric controller when its circuit is closed and the valve controlling the outlet opens.

2. Means for automatically regulating the outflow of liquid from a receptacle after the same has been boiled to a predetermined temperature, the combination of a valve for closing the outlet, an electric controller for opening said valve included in an electric circuit, a thermal circuit closer actuated by the temperature of the liquid whose discharge from the liquid receptacle is to be automatically governed, a signal included in an electric circuit adapted to be closed by said thermal circuit closer, and means for breaking the signaling circuit actuated by opening of the said valve.

3. In means for regulating the automatic discharge of liquid from a receptacle after a predetermined temperature has been reached, the same comprising a valve adapted to normally close the outlet from said receptacle, an electro-magnet included in a circuit, an armature coöperating with the electro-magnet, a rod or like connection between said armature and valve, a thermal circuit closer actuated by the temperature of the liquid whose discharge from the receptacle is to be governed, an electric signaling device included in a circuit which is closed by the aforementioned thermal circuit closer, said signaling circuit including coöperating contacts, one of said contacts being controlled by the aforesaid rod whereby when the valve is open the signaling circuit is broken.

4. In apparatus of the character described, the combination of a casing, an electric controller located within said casing and comprising an electro-magnet and coöperating armature, an electric generator located within said casing and included in the circuit with said electro-magnet, a thermal circuit closer fitted to said casing and having a projecting part to be immersed in the boiling liquid whose automatic discharge is to be regulated, and a valve for controlling the outlet of the receptacle in which the liquid is to be boiled, said valve having connection with the armature of the aforementioned electric controller to be operated thereby.

5. In combination, a receptacle provided with an outlet, a nozzle fitted to said outlet, a valve normally closing said nozzle, an electro-magnet included in an electric circuit, an armature coöperating with the electro-magnet, a rod connecting said armature with the valve, a thermal circuit closer adapted to be operated by the temperature of the liquid whose discharge is to be automatically controlled, and a signal included in an electric circuit which is adapted to be closed by said thermal circuit closer, said signaling circuit including coöperating contacts, one of which has adjustable connection with the aforementioned rod or connection between the armature and valve whereby when said valve is closed the contacts are in electrical connection and when said valve is open said contacts are separated.

In testimony whereof I affix my signature in presence of two witnesses.

LOUIS R. SMITH.

Witnesses:
CLARENCE J. GOLDTHORPE,
CLIFFORD N. QUIRK.